Dec. 31, 1968  I. L. MARSHACK  3,418,732
FOOT SUPPORTING CONSTRUCTION
Filed Aug. 19, 1965

INVENTOR.
IRVING L. MARSHACK
BY
ATTORNEY.

United States Patent Office 3,418,732
Patented Dec. 31, 1968

3,418,732
FOOT SUPPORTING CONSTRUCTION
Irving L. Marshack, La Jolla, Calif., assignor, by mesne assignments, to Mobay Chemical Company, Pittsburgh, Pa., a corporation of Delaware
Filed Aug. 19, 1965, Ser. No. 480,867
19 Claims. (Cl. 36—44)

ABSTRACT OF THE DISCLOSURE

A foot-supporting component for a shoe comprising a central sheet of foamed thermoplastic with a sheet of thermoplastic film bonded thereto positioned between outer sheets of fabric backed thermoplastic film, the sheets being united by a heat seal seam, and its production by stacking the component sheets and die sealing cutting the component from the stack.

---

This invention relates to a component of a shoe, and more particularly, to an improved construction for the support of the foot and a method for making it.

In preparing constructions such as insoles for use in footwear, it is most desirable to use a foam inner layer covered with a thermoplastic resinous film due to the respective properties of these components. On the other hand, however, and also because of the characteristics of these two materials, it is extremely difficult to obtain a satisfactory bond between the foam inner layer and the thermoplastic covering layers in the preparation of the laminated construction. One method has been suggested for preparing constructions of this type in which the foam layer is heat sealed between the layers of resinous film which cover it. The construction, as well as the method for preparing it by heat sealing the layers together, is disclosed, for example, in U.S. Patents 2,979,836 and 3,026,233. Briefly, the process described in these two patents involves laying a sheet of plastic material such as vinyl on and/or under a sheet of polyurethane foam whereupon the assembly is cut into the shape of an insole while the vinyl film is simultaneously heat-sealed around the periphery of the insole with an electronically activated die. In this manner, an insole is prepared which has a foam inner layer fused to the vinyl outer layer only at the fused joint at the edges of these layers which remain otherwise unattached throughout their foot-supporting surfaces.

It has been found, however, that the product thus prepared does not remain joined together during ordinary usage since the joint at which the foam is heat-sealed to the vinyl layer often separates while the shoe in which the insole has been placed is being worn. Further, due to the lack of adhesion between the vinyl layer and the foam layer throughout the foot-supporting surface of the insole, the foam layer becomes bunched up and stressed under the vinyl layer to which the foot applies pressures and counterpressures, resulting in the eventual tearing of the foam layer away from the heat-sealed joint or seam, thus destroying the effectiveness of the insole.

It is, therefore, an object of this invention to provide an improved construction for supporting the foot and a method for preparing it which is devoid of the foregoing disadvantages.

Another object of this invention is to provide a construction particularly suited to the fabrication of a supporting inner sole of a shoe or other footwear.

Yet another method of this invention is to provide a method for the fabrication of a foot-supporting construction which may be carried out easily and continuously.

A further object of this invention is to provide an improved foot-supporting construction which permits great comfort in use while possessing a very high durability factor.

Still other objects will become apparent from the following description with reference to the accompanying drawings throughout in which like reference characters indicate like parts, and in which FIGURE 1 is a plan view of one form of a die element suitable for use in making the product of this invention;

Figure 1:
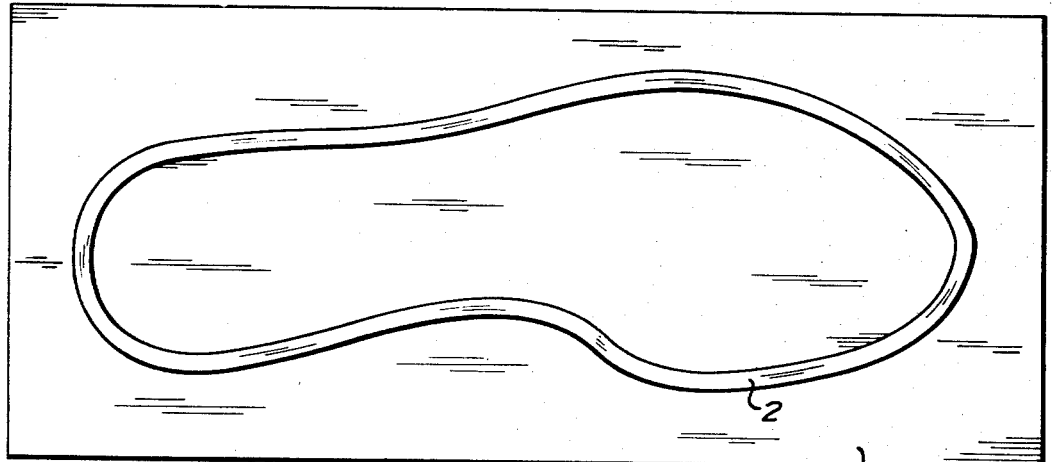

The foregoing objects and others are accomplished in accordance with this invention, generally speaking, by providing a foot-supporting construction to be used in footwear, prepared by laminating at least one sheet of a thermoplastic synthetic resin to a sheet of flexible or semi-flexible polyurethane foam, and simultaneously shaping and laminating a fabric backed thermoplastic synthetic resinous material which covers the foam layer on each side to the foam construction by heat-sealing around the periphery of the shape desired. The invention thus provides a construction particularly adapted for use as a foot-supporting means in the fabrication of footwear of all types, as well as an assembly method for making this construction.

In the practice of this invention, one of the components of the foot-supporting construction is the foam inner layer which must be prepared from a flexible or semi-flexible polyurethane foam in order to obtain the maximum in durability, wearability and comfort. Materials such as vinyl filled polyurethane foams have been suggested in the past for use as the foam layer in laminated constructions of this type, but it has been found that these materials are undesirable, since they require added expense and entail a greater number of operations in their preparation. Further, vinyl filled polyurethane foams are undesirable because the presence of the vinyl component throughout the cellular structure alters the properties, both physical and chemical, of the polyurethane foam. Flexible and semi-flexible polyurethane foams having only a vinyl coating do not have this disadvantage and the foot-supporting constructions of this invention have maximum durability, wearability and comfort.

In preparing the laminate used as the foot-supporting construction of this invention, any thickness of foam may be employed, and the ultimate choice of thickness of the foam layer to be used is limited only by the materials at hand, the type of supporting structure to be prepared and the machinery with which the operator has to work. Generally, however, the thickness of the foam core appropriate for the preparation of the inner sole of this invention will rarely be less than about ⅛ of an inch and will rarely exceed about 1 inch, with the preferred thickness being about ¼ of an inch.

The foam layer to be used is covered with at least one sheet of a thermoplastic resin, preferably polyvinyl chloride, which is adhered to the foam layer by means of a plastisol in accordance with the process described in my co-pending application Ser. No. 396,490, filed Sept. 15, 1964. Either one or both sides of the foam layer may be covered with the plastisol bonded thermoplastic sheeting, but at least one side of the foam layer must absolutely have a thermoplastic sheet adhered thereto for the product of this invention to be properly prepared.

It has been found that one of the key aspects of this invention in obtaining a proper, lasting and extremely durable laminated construction is the presence of this layer of thermoplastic film plastisol-bonded to the foam layer itself on at least one side. Where prior art constructions continue to be unsatisfactory for use in supporting the foot and weathering the stresses and counterstresses thus applied to them, the laminated construction of this invention continues to exhibit the most remarkable characteristics of comfort as well as unbelievable durability. Further, it is extremely surprising to find that, in addition to obtaining a heat-sealed product having an inordinately durable seam or jointure, the laminated construction of this invention does not suffer from the prior art disadvantage outlined hereinbefore where the inner foam layer tears away from the seam due to the stresses and counterstresses applied to the laminated construction when it is used as an inner sole, even though the inner foam layer is attached to the thermoplastic, fabric backed outer layers only at the heat-sealed jointure. The invention thus traverses the prior art hurdles which prevented the formation of a satisfactory inner sole construction.

The thermoplastic film used in preparing the product of this invention can be any suitable film of thermoplastic resin such as, for example, polyvinyl acetate, polyethylene, polyurethane, polypropylene or the like but it has been found most convenient to use a film of polyvinyl chloride so this material is preferred. The thermoplastic film with a fabric backing used as the exterior covering of the product should preferably be between 5 to 10 mils but even thicker films can be used. The thermoplastic film which is adhesively bonded to the polyurethane foam core need be only about 2 or 3 mils thick but it can be even thicker if desired.

The foot-supporting construction is preferably fabricated so that the top layer, or the surface that supports the foot directly, can be disposed in a shoe or some other footwear with the thermoplastic side facing the foot and the fabric backing facing the thermoplastic covering adhered to the foam layer. Thus, where only one surface of the foam layer has a thermoplastic film plastisol bonded thereto, that surface is the one which faces the top layer of the foot-supporting construction. The bottom layer of the construction is preferably disposed so that the thermoplastic film surface is facing the foam inner layer and the fabric backing will face the sole of the shoe when the inner sole of this invention is put in place in a shoe. This preferred mode of construction results in a rough and permeable bottom for the inner sole so that it can be adhered or bonded properly to the inside of the shoe with any suitable adhesive. However, where this consideration is not of primary import, or where the footwear to be prepared is of the slipper or sandal type in which the construction of this invention is to be used without being bonded into any supporting structure, the bottom layer of the laminated construction can also be disposed so that the fabric backing faces the foam inner layer. In one embodiment of this invention, the exterior thermoplastic sheets can be used without the fabric backing where appropriate, or one exterior thermoplastic sheet may have a fabric backing while the other exterior sheet does not.

In order to more particularly describe the invention, reference may be had to the drawings in which FIGURE 1 represents a die element which may be used to prepare the foot-supporting construction of this invention. The die is composed of a base plate 1 having disposed thereon a die element 2 made from any suitable bar stock in any desired configuration. The base plate 1 is mounted either on head 3 or base 4 of a suitable electronically activated press.

Figures 2, 5:
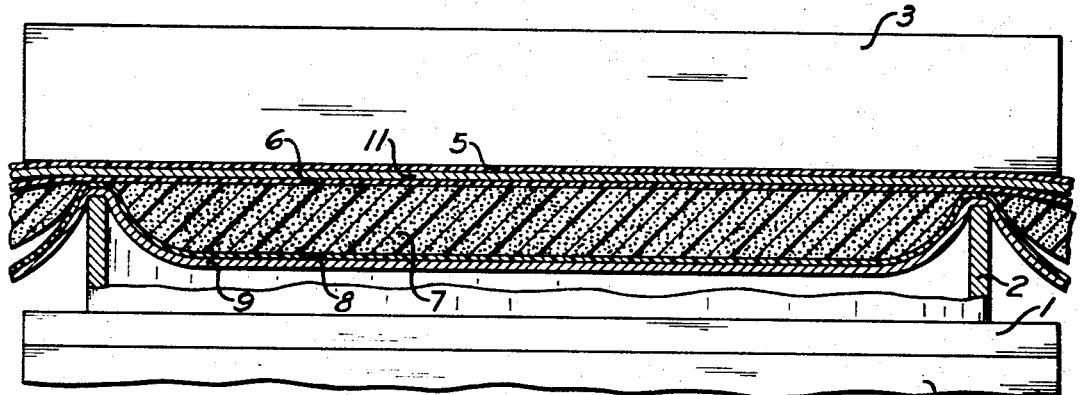
FIGURE 2 is a fragmentary elevation, partially in section, of a press and die assembly suitable for use in practicing the invention.
FIGURE 5 is a fragmentary elevation, partially in section of a press and die assembly suitable for use in practicing another embodiment of the invention.

FIGURE 2 shows one type of press and die assembly suitable for use in practicing this invention in which the base plate 1 lies against the base 4 of the press. In making an inner sole of a shoe in accordance with one embodiment of this invention, a laminate of fabric 9 and thermoplastic film 8 is laid over die 2 with the fabric backing 9 lying against the die. The polyurethane foam core 7 having at least one thermoplastic film 6 bound adhesively thereto is then placed over the fabric backed film. As shown, in the instance that only a single sheet of thermoplastic film is adhered to the foam layer in accordance with the preferred embodiment of this invention, the core 7 is placed on the fabric backed film with its thermoplastic film 6 on the side opposite the fabric backed film 8 and 9.

Figure 3:
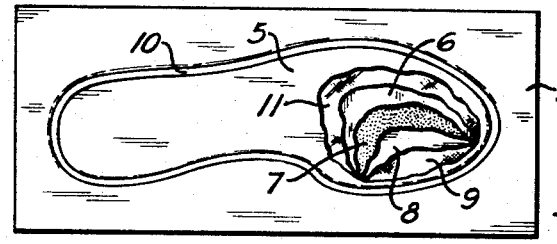
FIGURE 3 is a plan view of one product obtained from the assembly of FIGURE 2.
Figure 4:
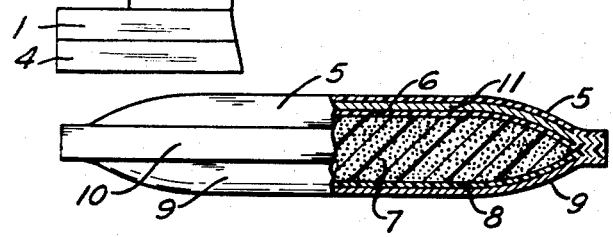
FIGURE 4 is an elevation, partially in section, of the product of FIGURE 3.

A second fabric backed thermoplastic sheet, wherein the fabric is designated as 11 and the thermoplastic sheet is designated as 5, is then placed over the core 7 with fabric 11 lying coextensively against film 6. In an alternative embodiment, illustrated in FIGURE 5, the fabric backings 9 and 11 of the laminates each face the foam inner layer 7 and said foam inner layer 7 has a thermoplastic film 6 bound adhesively on both its top and bottom sides. Press head 3 is moved downwardly upon this assembly, which extends beyond the edges of the die 2 when the assembly is in place, until the assembly is compressed between the head 3 and the edge of the die 2. The die is then electronically energized until the foam core 7 is substantially displaced from between the die edge and the head of the press and fabric backed thermoplastic film 8 has become heat sealed to fabric backed thermoplastic film 5 with thermoplastic film 6 therebetween to form a heat seal 10 as shown in FIGURE 3. The seal forms a seam or jointure which corresponds to the configuration of the die 2. Any extraneous material 12 lying around the outside of the heat seal 10 is scrap and may be removed by cutting along the outer edge of the heat seal 10 to provide a product of the type shown in FIGURE 4. The width of the heat seal or jointure 10 corresponds to the width of the bar stock used in making die 2. In making an inner sole for a shoe as shown in FIGURES 3 and 4, the width of the bar stock should be of a sufficient dimension so that the laminated construction is provided with an edge of sufficient width and weight to allow the inner sole to be sewn into the shoe when it is assembled therein.

It is apparent, then, that the foot-supporting structure of this invention has two fabric backed thermoplastic sheets heat-sealed to one another about a foam core having at least one sheet of thermoplastic film adhesively bonded thereto. In addition, in the preparation of this construction, some air becomes entrapped between the layers of the assembly which provides the construction with an additional cushioning effect which is particularly important for the preparation of foot-supporting structures. This type of structure is far more advantageous than one in which the thermoplastic film is sealed directly to the polyurethane foam over its entire surface, since the fabric backed thermoplastic sheeting is free to spread with respect to the foam core providing, in addition to the cushioning effect, a kind of cooperation among the layers which complements the motions of the foot and yields to them, thus providing a means by which the wearer is saved from the vexation of recurring foot fatigue.

A 6 kilowatt dielectric machine has been found adequate for practicing this invention. Usually a sealing time of 3 to 4 seconds is used while preferably setting the machine at 3–6 kilowatts.

Although the invention has been described in considerable detail for the purpose of illustration, it is to be understood that variations can be made by those skilled in the art without departing from the spirit of the invention and scope of the claims.

What is claimed is:

1. A method for the preparation of a foot-supporting construction which comprises disposing a sheet of foam having a sheet of thermoplastic film bonded to at least one surface thereof between two sheets of fabric backed thermoplastic sheeting and heat sealing the structure thus prepared around the shape desired.

2. The method of claim 1 wherein the fabric backed thermoplastic sheets are disposed in such a manner that the fabric backing of each sheet faces the foam inner layer.

3. The method of claim 1 wherein one fabric backed thermoplastic sheet is disposed with the fabric backing facing the foam inner layer while the other fabric backed thermoplastic sheet is disposed with the thermoplastic surface facing the foam inner layer.

4. A method for the preparation of a foot-supporting structure which comprises disposing between the surfaces of a die and a die press a sheet of fabric backed thermoplastic film with the fabric backing facing the bottom surface of the die while the thermoplastic surface faces the cavity of the die; placing a sheet of foam on top of the fabric backed thermoplastic film, said sheet of foam having a sheet of thermoplastic film adhesively bonded thereto on at least one surface; covering the foam layer with a second sheet of fabric backed thermoplastic film in such a manner that the fabric backing faces the foam layer while the thermoplastic surface faces the die press; compressing the edges of the assembly by bringing the die press head down on the die; electronically energizing the die to displace the foam from between the sheets of fabric backed thermoplastic film and heat seal the laminated construction.

5. A method for the preparation of a foot-supporting structure which comprises disposing between the surfaces of a die and a die press a sheet of fabric backed thermoplastic film with the thermoplastic surface facing the bottom surface of the die while the fabric backing faces the cavity of the die; placing a sheet of foam on top of the fabric backed thermoplastic film, said sheet of foam having a sheet of thermoplastic film adhesively bonded thereto on at least one surface; covering the foam layer with a second sheet of fabric backed thermoplastic film in such a manner that the fabric backing faces the foam layer while the thermoplastic surface faces the die press; compressing the edges of the assembly by bringing the die press head down on the die; electronically energizing the die to displace the foam from between the sheets of fabric backed thermoplastic film and heat seal the laminated construction.

6. The method of claim 1 wherein the foam layer has a thermoplastic film adhesively bonded to only one surface.

7. The method of claim 1 wherein the foam layer is a polyurethane foam.

8. The method of claim 1 wherein the thermoplastic film adhesively bonded to the foam layer is polyvinyl chloride.

9. A foot-supporting construction comprised of two sheets of a fabric backed thermoplastic film having disposed therebetween a sheet of foam having a sheet of thermoplastic film bonded to at least one surface thereof, said fabric backed thermoplastic sheets being disposed such that the fabric backing of each sheet faces the foam layer, the edge of the foot-supporting construction being a jointure at which the fabric backed thermoplastic films have formed a seam.

10. A foot-supporting construction comprised of two sheets of a fabric backed thermoplastic film having disposed therebetween a sheet of foam having a sheet of thermoplastic film bonded to at least one surface thereof, one sheet of said fabric backed sheeting being disposed such that the fabric backing faces the foam inner layer and the other fabric backed thermoplastic sheet being disposed such that the thermoplastic sheeting faces the foam inner layer, the edge of the foot-supporting structure being a jointure at which the fabric backed thermoplastic films have formed a seam.

11. A foot-supporting construction comprising a sheet of foam having a sheet of thermoplastic film bonded to at least one surface thereof disposed between two sheets of fabric backed thermoplastic sheeting, the edge of the foot-supporting construction being a jointure at which the fabric backed thermoplastic films have formed a seam.

12. The construction of claim 9 wherein the foam layer has a thermoplastic film adhesively bonded to only one surface.

13. The construction of claim 9 wherein the foam layer has a thermoplastic film adhesively bonded to both surfaces.

14. The construction of claim 9 wherein the foam layer is a polyurethane foam.

15. The construction of claim 9 wherein the thermoplastic film adhesively bonded to the foam layer is polyvinyl chloride.

16. The construction of claim 9 wherein the thickness of the thermoplastic film bonded to the foam layer is from about 2 to about 3 mils.

17. A foot-supporting construction comprised of two sheets of a fabric backed thermoplastic film having disposed therebetween a sheet of foam consisting entirely of polyurethane foam except for at least one surface thereof to which is bonded a sheet of thermoplastic film, said fabric backed thermoplastic sheets being disposed such that the fabric backing of each sheet faces the foam layer, the edge of the foot-supporting construction being a jointure at which the fabric backed thermoplastic films have formed a seam.

18. A method for the preparation of a foot-supporting construction which comprises disposing a sheet of foam consisting entirely of polyurethane except for at least one surface thereof to which is bonded a thermoplastic film of polyvinyl chloride, between two sheets of fabric backed thermoplastic sheeting, and heat sealing the structure thus prepared around the shape desired.

19. A shoe, slipper or the like having as an element thereof, a member adapted to lie against the sole of the foot comprising a polyurethane core, a plastisol film on at least one surface of the core, a thermoplastic film bonded to the core by means of the plastisol, an unbonded thermoplastic film of greater thickness lying over the first said film, a second unbonded thermoplastic film covering that surface of the core opposite the one having the bonded film thereover, and a heat seal about the edge of the core formed from the said thermoplastic films, at least one said unbonded thermoplastic film having a fabric reinforcement.

References Cited

UNITED STATES PATENTS

| | | | |
|---|---|---|---|
| 2,626,886 | 1/1953 | Scholl | 128—112 X |
| 2,658,288 | 11/1953 | Scholl | 36—44 |
| 3,170,178 | 2/1965 | Scholl | 36—44 X |

PATRICK D. LAWSON, *Primary Examiner.*

ALFRED R. GUEST, *Assistant Examiner.*

U.S. Cl. X.R.

12—146; 128—595